United States Patent
Ehrne

(10) Patent No.: US 8,727,311 B2
(45) Date of Patent: May 20, 2014

(54) VACUUM VALVE WITH GAS-TIGHT SHAFT PENETRATION

(75) Inventor: Florian Ehrne, Feldkirch (AT)

(73) Assignee: Vat Holding AG (CH)

( * ) Notice: Subject to any disclaimer, the term of this patent is extended or adjusted under 35 U.S.C. 154(b) by 392 days.

(21) Appl. No.: 13/062,458

(22) PCT Filed: Aug. 27, 2009

(86) PCT No.: PCT/EP2009/061061
§ 371 (c)(1),
(2), (4) Date: Mar. 4, 2011

(87) PCT Pub. No.: WO2010/026100
PCT Pub. Date: Mar. 11, 2010

(65) Prior Publication Data
US 2011/0168937 A1    Jul. 14, 2011

(30) Foreign Application Priority Data
Sep. 5, 2008   (EP) ..................................... 08015681

(51) Int. Cl.
*F16K 1/22*    (2006.01)
*F16K 31/00*   (2006.01)
*F16K 31/44*   (2006.01)
*F16K 35/00*   (2006.01)

(52) U.S. Cl.
USPC ........... 251/305; 251/214; 251/306; 251/355; 137/384

(58) Field of Classification Search
USPC ................. 137/384; 251/214, 305, 306, 355
See application file for complete search history.

(56) References Cited

U.S. PATENT DOCUMENTS

| 734,633 | A | * | 7/1903 | Titus ............................... 277/514 |
| 1,293,607 | A | * | 2/1919 | Dawson ........................ 277/398 |
| 2,066,250 | A | * | 12/1936 | Clark ........................ 137/246.22 |
| 2,353,549 | A |   | 7/1944 | Dalzell et al. |
| 2,655,942 | A | * | 10/1953 | Dougherty .................... 251/163 |
| 3,099,431 | A | * | 7/1963 | Ritter et al. .................... 251/214 |
| 3,351,351 | A |   | 11/1967 | Bentley-Leek |
| 3,371,676 | A | * | 3/1968 | Mullaney, III ........... 137/246.19 |
| 3,544,068 | A | * | 12/1970 | Rice ............................... 251/355 |
| 3,586,289 | A |   | 6/1971 | Priese |
| 3,904,173 | A | * | 9/1975 | Naylor ......................... 251/306 |
| 4,111,392 | A | * | 9/1978 | Edelmann ..................... 251/214 |
| 4,809,950 | A |   | 3/1989 | Geiser |
| 4,881,717 | A |   | 11/1989 | Geiser |

(Continued)

FOREIGN PATENT DOCUMENTS

CH    443817 A    9/1967
FR    1 435 649 A    6/1996

(Continued)

*Primary Examiner* — John K Fristoe, Jr.
*Assistant Examiner* — Kevin Barss
(74) *Attorney, Agent, or Firm* — Muncy, Geissler, Olds & Lowe, P.C.

(57) ABSTRACT

The invention relates to a vacuum valve for interrupting, releasing or controlling a flowing medium in the interior (3) of the vacuum valve (1). A shaft (6) coupled to a valve drive (5) is routed gas-tight from the atmospheric area (4) to the interior (3) through a valve housing (2) by way of a sealing shaft penetration (20) so that a movement produced by the valve drive (5) can be transferred from the atmospheric area (4) to the interior (3) for the purposes of interrupting, releasing or controlling the flow.

8 Claims, 2 Drawing Sheets

(56) References Cited

U.S. PATENT DOCUMENTS

Figure 1:
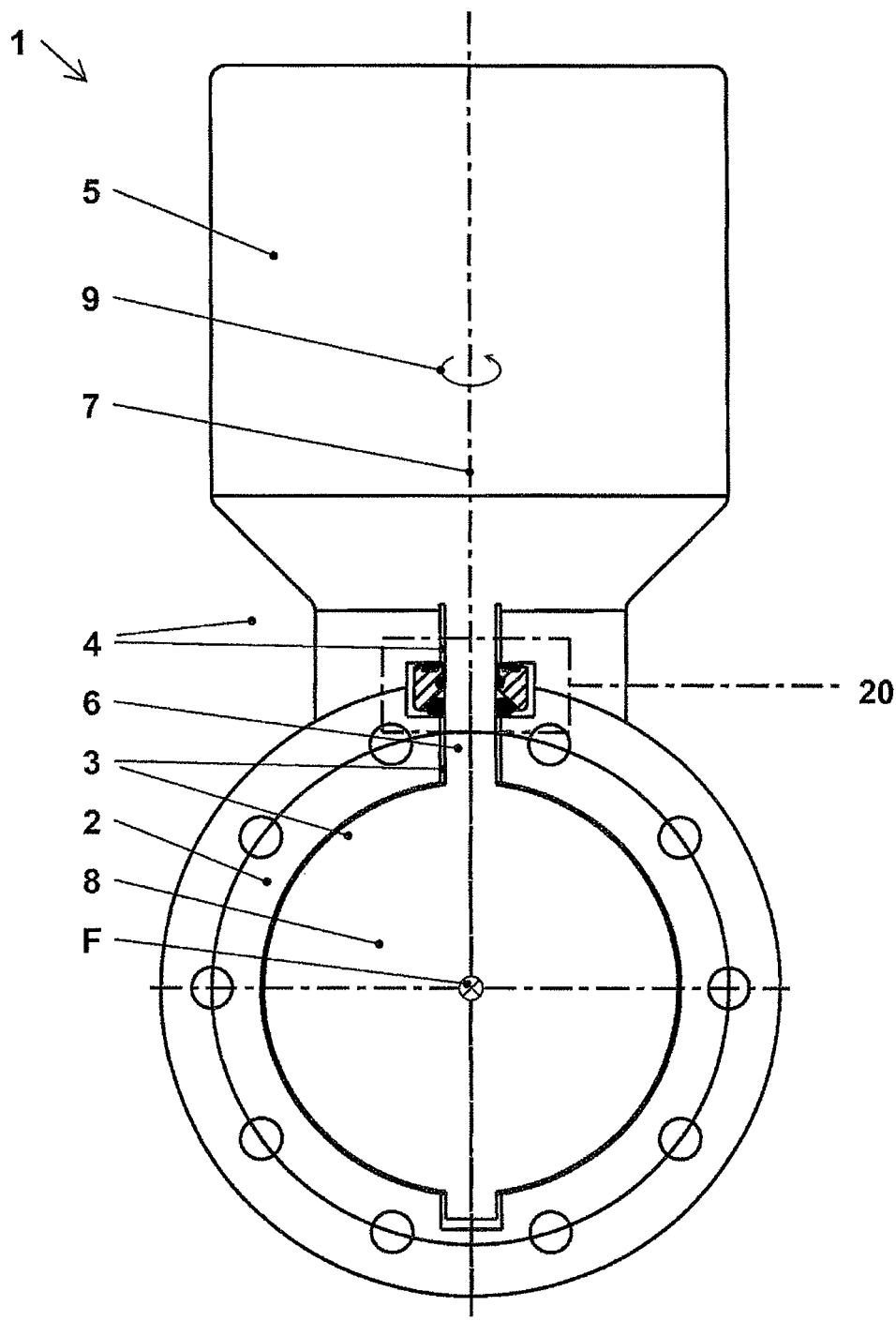

| | | | |
|---|---|---|---|
| 4,885,947 A | 12/1989 | Balter et al. | |
| 4,886,241 A * | 12/1989 | Davis et al. | 251/214 |
| 5,044,606 A * | 9/1991 | Wordin | 277/522 |
| 5,927,685 A | 7/1999 | Gosling | |
| 6,076,831 A | 6/2000 | Pfannenschmidt | |
| 6,089,537 A | 7/2000 | Olmsted | |
| 6,367,770 B1 | 4/2002 | Duelli | |
| 6,439,255 B1 | 8/2002 | Chamberlain | |
| 6,629,682 B2 | 10/2003 | Duelli | |
| 2004/0129909 A1 | 7/2004 | Wiese | |
| 2005/0210648 A1 | 9/2005 | Putnam et al. | |
| 2008/0231000 A1 | 9/2008 | Xu | |

FOREIGN PATENT DOCUMENTS

| | | |
|---|---|---|
| GB | 2 404 237 | 1/2005 |
| JP | H0394485 A | 4/1991 |
| JP | 05-64577 | 8/1993 |
| JP | H1126483 A | 1/1999 |
| JP | H11182730 A | 7/1999 |
| JP | 2004521278 A | 7/2004 |
| WO | WO-2007/022722 A | 3/2007 |

* cited by examiner

VACUUM VALVE WITH GAS-TIGHT SHAFT PENETRATION

This application is a national stage of International Application No.: PCT/EP2009/061061, which was filed on Aug. 27, 2009, and which claims priority to European Patent Application No.: 08015681.3, which was filed in Europe on Sep. 5, 2008, and which are both herein incorporated by reference in their entirety.

The invention relates to a vacuum valve for interrupting, releasing or regulating a flow of a medium flowing along a flow path in the inner region of the vacuum valve according to the preamble of claim 1.

The prior art discloses various embodiments of vacuum valves which have, running through the valve housing, a valve channel which can be closed in a gas-tight manner by means of a valve closure. Different vacuum valves are used in particular in IC and semiconductor production, which has to take place in a protected atmosphere as far as possible without any contaminating particles being present. For example, in an installation for producing semiconductor wafers or liquid-crystal substrates, the highly sensitive semiconductor or liquid-crystal elements pass through, one after the other, a number of process chambers, in which the semiconductor elements located within the process chamber are processed by means of a processing device in each case. Both during processing within the process chamber and during transportation from process chamber to process chamber, the highly sensitive semiconductor elements always have to be in a protected atmosphere—in particular in a protective gas atmosphere or in an environment which is void of air and free of particles. The process chambers are connected to one another, for example, via connecting passages, wherein the process chambers can be opened by means of vacuum valves, for the purpose of transferring the parts from the one process chamber to the next, and then closed in a gas-tight manner in order for the production step to be carried out in each case. Use is also made of movable transfer chambers which can dock against the process chambers and transport the semiconductor elements in a protective atmosphere between the process chambers.

Such vacuum valves which have semiconductor parts passing through them are also referred to as vacuum transfer valves, on account of the application area described and the associated dimensioning, as rectangular valves, on account of their rectangular opening cross section, and as slide valves, rectangular gate valves or transfer slide valves, on account of their customary functioning methods. Slide valves with a wedge-shaped valve closure are also referred to as wedge valves.

Use is also made of vacuum valves for opening and closing gas channels or for regulating a flow of a medium through the gas channel. Such valves are located, for example, within a system of tubes between a process chamber or a transfer chamber and a vacuum pump or the atmosphere. The opening cross section of such valves, also referred to as pump valves, is usually substantially smaller than in the case of a vacuum transfer valve. Different designs of such vacuum valves are known, for example vacuum angle valves, slide valves, butterfly valves, rotary valves and pendulum valves.

A distinction can be drawn between those vacuum valves which are designed merely for fully opening and fully closing a gas channel, or some other opening, and cannot assume any defined intermediate position on a constant basis, and those vacuum valves which are designed for assuming an intermediate position between the fully open and the fully closed state, and are therefore suitable for regulating throughflow. Such valves are therefore also referred to as regulating or control valves.

In addition, depending on the drive technology used in each case, a distinction is made in particular between valves with, on the one hand, a linear closing and opening movement and, on the other hand, a rotary closing and opening movement, wherein a combination of movements is also possible.

Examples of vacuum valves with a throughflow cross section which can be changed by a rotary movement of the valve closure are rotary valves, also referred to as butterfly valves or flutter valves, and pendulum valves, louver valves or chevron-type valves. In the case of a rotary valve, the flow of the medium flowing along the flow path is interrupted, released or regulated by a rotary movement of a closure flap arranged in the flow path, wherein at least one component of the axis of rotation of the closure flap runs perpendicularly to the flow axis of the flow path. Such rotary valves, butterfly valves and throttle valves are generally known and are disclosed, inter alia, in GB 2 404 237 (Wareham) or US 2004/0129909 A1 (Wiese). A louver valve has a plurality of such flaps, with the axes of rotation running, for the most part, parallel to one another and perpendicularly to the flow axis of the flow path. A chevron-type valve has two parallel closing plates which can be rotated in relation to one another, rest one upon the other and have an axis of rotation running substantially parallel to the flow axis. The closing plates each have—in particular radially running slot-like—openings which, in a first rotary position of the closing plates relative to one another, are aligned in relation to one another and thus release the flow path and, in a second rotary position of the closing plates relative to one another, overlap and thus block the flow path. In the case of a pendulum valve, as is known for example from U.S. Pat. No. 6,089,537 (Olmsted), a closure plate is pivoted into the flow path about an axis running substantially parallel to the flow axis, and therefore the opening cross section can be reduced and the flow path blocked.

In the case of slide valves, a valve closure, in particular a closure plate, is slid linearly into the flow path for the most part perpendicularly to the flow axis. Gas-tight closure takes place either by means of this linear movement or, in addition, by a second movement in the direction parallel to the flow path. A slide valve in the case of which the closing and sealing operation takes place via a single linear movement is, for example, either a wedge valve, as presented inter alia in U.S. Pat. No. 6,367,770 B1 (Duelli), or the transfer valve which is known by the product name "MONOVAT series 02 and 03", is configured as a rectangular gate valve, produced by VAT Vakuumventile AG, Haag, Switzerland, and the construction and functioning of which are described, for example, in U.S. Pat. No. 4,809,950 (Geiser) and U.S. Pat. No. 4,881,717 (Geiser).

Various sealing devices are known from the prior art, for example from U.S. Pat. No. 6,629,682 B2 (Duelli). An example of a suitable material for sealing rings is the elastic sealing material known by the trade name Viton®.

All these vacuum valves have in common the fact that at least one movable valve closure is arranged in the flow path in the inner region of the valve housing, and the operation of interrupting, releasing or regulating the flow of a medium flowing along the flow path can be brought about by the movement of the valve closure. This movement may be, in particular, a rotary movement and/or a linear movement.

It is possible here to provide the valve drive for generating the movement within the vacuum region. Designs in which vacuum-compatible stepping motors without any lubricant are used are known. The production of such motors requires special materials for bearings, etc., in order to keep the generation of undesired particles produced, inter alia, by friction in the vacuum region to a low level. Even if arranging the drive in the inner region of the vacuum valve avoids the transmission of movement from the atmosphere region into the vacuum region, and allows corresponding sealings to be dispensed with, this arrangement of the drive in the vacuum region involves comparatively high outlay in particular if used in highly sensitive ultra-high-vacuum applications, and in some cases is not possible at all.

The valve drive for generating the movement is therefore arranged, for the most part, outside the vacuum region, in the atmosphere region, wherein the movement is then routed in a gas-tight manner via at least one mechanism, in particular a shaft, from the atmosphere region into the inner region of the valve by way of a sealing feedthrough.

Vacuum-tight rotary or linear feedthroughs with a shaft passing through from the vacuum side to the atmosphere side are known for the purpose of transmitting rotary, or translator or linear, movements from outside a vacuum region into the interior of a vacuum region with high precision, high stability and high torques and/or forces, wherein the shaft is routed in a gas-tight manner into the vacuum by way of the sealing shaft feedthrough by at least one sealing ring being arranged between the shaft and the feedthrough.

Such straightforward rotary or linear feedthroughs are used in numerous vacuum valves and have proven successful thanks to advanced sealing materials for a large number of application areas. Problematic application areas, however, prove to be those in which the sealing material is subjected to relatively large temperature fluctuations and/or very large differences in pressure between the atmosphere region and the vacuum region. Most sealing materials used expand under the action of heat, and this increases the pressing action between the seal and the shaft. If the force between the seal at rest and the moved shaft exceeds a certain limit value, the wear to which the seal is subjected increases considerably. In some circumstances, the seal is even damaged and fails, and this therefore results in gas penetrating and, possibly, in considerable damage. On the other hand, a minimum contact-pressure force always has to be maintained in order to ensure the sealing between the seal and shaft. Depending on the coefficient of thermal expansion of the sealing material, the temperature range within which the vacuum valve can be operated, with sealing and service lives being ensured all the while, is limited.

The prior art discloses various proposals for transmitting rotary movements into the interior of a vacuum region from the outside with a high degree of sealing.

U.S. Pat. No. 4,885,947 (Balter et al.) describes a vacuum-tight rotary feedthrough with a first shaft and a second shaft for transmitting rotary movements into the interior of the vacuum chamber from outside the same. The first shaft here is designed as a hollow shaft and the second shaft is mounted such that it can be rotated in the first shaft. The shafts do not form shafts which are continuous from the vacuum side to the atmosphere side. The rotary movements are transmitted via a complex transmission mechanism. At the outer end, the first shaft has an eccentrically arranged recess which is inclined relative to the axis of rotation and into which a conical sleeve projects. The first shaft is rotated by an orbital movement of the conical sleeve. Rotation of the second shaft likewise takes place via an eccentric drive. The shafts are sealed via a folding bellows in each case. The complex construction of this vacuum-tight rotary feedthrough means that the precision and stability of rotary-movement transmission are impaired. Furthermore, it is only possible to transmit relatively small torques.

US 2005/0210648 A1 discloses a device for prestressing a packing seal in a needle valve. The needle-valve stem, which can be rotated about its axis, is routed with sealing action into the valve interior, wherein a packing seal in the housing ensures sealing between the cylindrical valve stem and a cylindrical wall of the valve housing. The cylindrical wall encloses the cylindrical valve stem, wherein the packing seal is arranged in the annular intermediary region between the wall and the valve stem. The annular packing seal comprises a pair of wedge-shaped packing elements guided one inside the other. As a result of an axial force to which the packing elements are subjected by means of springs, the packing seal is squeezed in the radial direction between the cylindrical valve stem and the cylindrical wall, and therefore the annular interspace between the cylindrical valve stem and the cylindrical wall is completely filled, with sealing action, by the packing seal. The axial force is provided by springs. One problem with the abovedescribed device for prestressing the packing seal is that thermally induced expansion of the packing seal in the radial direction inevitably gives rise to a drastic increase in the radial sealing force on the cylindrical valve stem and thus to the seal being subjected to increased wear, in particular upon rotation of the valve stem. The above-described device may well be suitable to a limited extent for compensating for axial expansion of the packing seal parallel to the valve stem by the compliance of the spring, but it is not suitable for ensuring a substantially radial sealing force of the seal on the rotatable valve stem in the event of thermally induced expansion of the seal in the radial direction in relation to the valve stem.

It is therefore an object of the invention to provide a vacuum valve of straightforward construction in the case of which a movement generated in the atmosphere region can be transmitted into the inner region of the vacuum valve within a wide temperature range, with gas sealing being ensured in the process.

This object is achieved by realizing the features of the independent claim. Features which develop the invention in an alternative or advantageous manner can be found in the dependent patent claims.

The invention comprises a vacuum valve for interrupting, releasing or regulating a flow of a medium flowing along a flow path in the inner region of the vacuum valve. This vacuum valve may thus be a valve which can be switched between two or more discrete states—e.g. open and closed—or a control valve which can be adjusted as desired and has a flow cross section which can be freely adjusted within certain limits. The medium flowing through the valve is preferably a gas, or else a liquid. The vacuum valve has a valve housing, which separates the inner region of the vacuum valve in a gas-tight manner from the atmosphere region outside the vacuum valve. The flow path runs through the inner region of the vacuum valve. It is possible for the valve housing to be in one piece or to comprise a plurality of individual parts which are connected to one another such that the inner region is separated in a vacuum-tight manner from the atmosphere region. The valve housing preferably has at least two connections which form openings to the inner region of the vacuum valve and through which the flow path leads. By means of the vacuum valve, the connection leading through the inner region of the vacuum valve, and thus the flow of the medium made possible between the at least two connections, can be interrupted and released or, in the case of a regulating or control valve, regulated by virtue of the flow cross section being varied.

Moreover, the vacuum valve has a valve drive, which can generate a movement in the atmosphere region, that is to say outside the inner region. The valve drive may be designed as an electric, pneumatic or hydraulic motor, in particular as a stepping motor or a pneumatic-cylinder unit, or as some other drive for generating a rotary or translatory, that is to say linear, movement. The valve drive generally assigned to the vacuum valve is coupled to the valve housing, at least partially integrated therein or isolated therefrom.

A shaft is coupled to the valve drive such that the movement generated by the drive in the atmosphere region gives rise to a movement of the shaft, or constitutes this movement. The shaft is generally understood as being a mechanical mechanism for transmitting a rotary or translatory movement, for example a rectilinear shaft or pushrod which is or is not rotationally symmetrical, wherein the movement is preferably either a rotary movement about the longitudinal axis of the shaft or a linear sliding movement along the longitudinal axis of the shaft. The shaft has a geometrical shaft axis which is formed in particular by the geometrical longitudinal axis of the shaft and runs in particular through the geometrical cross-section center point.

The shaft is routed in a gas-tight manner from the atmosphere region into the vacuum-tight inner region of the valve housing by way of a sealing shaft feedthrough. The shaft feedthrough has dynamic sealing properties, i.e. the sealing of the shaft feedthrough is ensured not just in a static state of the shaft, but also when the shaft is moving. The movement generated by the valve drive can be transmitted from the atmosphere region into the inner region by means of the shaft. The shaft feedthrough prevents a gas connection between the atmosphere region and the inner region and ensures a direct or indirect connection between the static valve housing and the dynamic shaft, which connection is gas-tight but allowing relative movement.

A valve closure is arranged in the flow path in the inner region of the vacuum valve, this inner region being vacuum-tight in the outward direction. This valve closure is coupled to the shaft, and therefore the movement generated by the valve drive gives rise, via the shaft, to movement of the valve closure, wherein the valve drive, the shaft, the shaft feedthrough, the valve closure, the valve seat and the valve housing are designed such that the operation of interrupting, releasing or regulating the flow of the medium flowing along the flow path can be brought about by the movement.

The shaft feedthrough has a first sealing ring, which consists of a material which expands under the action of heat, in particular an O-ring made of an elastomer. The material may be a fluoroelastomer, for example one of the materials which are commercially available by the following names: Viton® fluoroelastomer, e.g. Viton®A, Viton®B; Dai-el® fluoroelastomer, e.g. Dai-el® G 902, etc.; Tecnoflon™ or Tecnoflon™ fluoroelastomer.

The first sealing ring encloses the shaft concentrically with gas-tight sealing in the radial direction. In other words, the first sealing ring surrounds the shaft in a belt-like manner, wherein there is sealing contact between the inner surface of the first sealing ring and the outer surface of the shaft. The contact-pressure force of the first sealing ring, this force acting in the radial direction in relation to the shaft axis, is such that the shaft, depending on the embodiment of the invention, can execute a rotary movement about the shaft axis and/or a linear sliding movement along the shaft axis relative to the first sealing ring, with substantially vacuum-tight contact between the first sealing ring and the shaft.

The shaft feedthrough, moreover, has a bearing surface, which is coupled directly or indirectly to the valve housing and surrounds and encloses the shaft. For example, the bearing surface is formed by a shoulder in a hole in the valve housing, wherein the shaft is routed through the hole and the shoulder in the hole encloses the shaft all the way round. It is possible here for the bearing surface to be formed either by a portion of the valve housing or by some other element which is coupled to the valve housing, for example a collar or sleeve.

The first sealing ring rests on the bearing surface with gas-tight sealing, and this fixes the sealing ring in a direction parallel to the shaft and thus to the shaft axis, that is to say in the axial direction. For this purpose, the bearing surface is oriented axially in relation to the shaft, and therefore the sealing ring is fixed axially in a direction parallel to the shaft. The bearing surface preferably runs substantially in a plane to which the shaft axis forms a normal. In other words, the normals of the bearing surface here run parallel to the shaft axis. However, it is also possible for these normals of the bearing surface to extend in directions which, although not parallel to the shaft axis, are not perpendicular to the shaft axis either. In other words, the bearing surface need not necessarily form a geometrically precise plane; rather it may also be, in particular, an inwardly or outwardly inclined surface of a cone portion, for which reason the invention refers to a bearing surface which runs "substantially" in the aforementioned plane.

There is therefore a gas-tight contact at least partially in the axial direction between the first sealing ring and the bearing surface, wherein the first sealing ring rests on the bearing surface with gas-tight sealing in the axial direction and encloses the shaft with gas-tight sealing in the radial direction. The first sealing ring thus gives rise to gas-tight contact between the bearing surface and the shaft.

Furthermore, the shaft feedthrough comprises a supporting ring, which is arranged concentrically all the way round the shaft, and axially opposite the bearing surface. The supporting ring consists of a substantially rigid material. This should be understood to mean that the supporting ring is barely elastic, if at all, in comparison with the first sealing ring, and barely expands, if at all, under the action of heat in comparison with the first sealing ring. The supporting ring preferably consists of a metal, an alloy, a ceramic material or some other rigid material which, in comparison with an elastomer or some other sealing material of the first sealing ring, exhibits barely any tendency to expand thermally.

The supporting ring can be moved axially to a limited extent relative to the bearing surface, to the valve housing and parallel to the shaft axis and thus parallel to the shaft. It is thus possible to vary the distance between the bearing surface and the supporting ring within a certain range. The supporting ring has, on a portion oriented toward the bearing surface, an inner conical segment, which runs concentrically around the shaft and encloses the same. In other words, the supporting ring has an inner cone portion, wherein the center axis of the cone portion coincides with the shaft axis. The conical segment widens with a cone-opening angle in the direction of the bearing surface. In other words, the internal diameter of the supporting ring increases, in particular continuously, in the direction of the bearing surface. The conical segment is generally understood to mean a portion of the supporting ring. The inner conical segment of the supporting ring widens for example with a cone-opening angle of 45° to 135°, in particular 60° to 120°, in particular 80 to 100°, in the direction of the bearing surface, wherein the cone-opening angle should be understood to mean the inner angle of the virtual tip of the cone defined by the conical segment.

The first sealing ring is at least partially enclosed all the way round by the conical segment of the supporting ring and is clamped in between the conical segment and the bearing surface. An elastic spring, for example a helical spring around the shaft, forces the supporting ring axially in the direction of the bearing surface such that the conical segment forces the first sealing ring in an elastically compliant manner, and substantially under constant contact pressure, onto the bearing surface and the shaft. The conical segment here subjects the first sealing ring to force both in the radial direction in relation to the shaft and parallel to the shaft, in the direction of the bearing surface. If the first sealing ring expands, then the external diameter thereof increases, as does the axially and radially acting force between the first sealing ring and the supporting ring. However, the supporting ring yields to this force in that it can be adjusted in the axial direction away from the bearing surface, wherein the spring is compressed. In other words, the radial expansion of the first sealing ring is converted into an axial movement of the supporting ring by means of the supporting ring and the inner conical configuration thereof. The spring counteracts this axial movement in a compliant manner. The cone-opening angle is thus such that radial expansion of the first sealing ring brought about by the first sealing ring being subjected to the action of heat gives rise to an axial movement of the supporting ring in the direction away from the bearing surface. The elastic spring is designed here such that it yields to the axial movement of the supporting ring brought about by the radial expansion.

In one embodiment of the invention, the first sealing ring is designed as a first O-ring. As seen in the axial direction, there is substantially annular, gas-tight contact between the first O-ring and the bearing surface. As seen in the radial direction, there is substantially annular, gas-tight contact between the first O-ring and the shaft. There is supporting, preferably likewise annular contact between the first O-ring and the inner conical segment of the supporting ring, and therefore the first O-ring is supported obliquely in relation to the shaft and to the bearing surface. The first O-ring thus has three regions of contact around it, namely a first region of contact with the bearing surface, a second region of contact with the shaft and a third region of contact with the inner conical segment of the supporting ring. As seen in cross section of the first O-ring, the three regions of contact form a triangle, with the regions of contact being arranged in the corners thereof. The region of contact with the inner conical segment of the supporting ring is preferably located opposite the other two regions of contact, and therefore the inner conical segment forces the first O-ring uniformly both onto the bearing surface and onto the shaft.

In a first possible embodiment of the invention, the portion of the supporting ring which is oriented toward the bearing surface is directed toward the inner region, and the supporting ring and the spring are arranged in the atmosphere region. One advantage of this embodiment is that the inner region does not accommodate the particle-generating elements, in particular the spring.

In a second possible embodiment of the invention, the portion of the supporting ring which is oriented away from the bearing surface is directed toward the inner region, and the supporting ring and the spring are arranged in the inner region.

According to one possible embodiment, the valve drive is designed for generating a rotary movement. The shaft feedthrough here is a rotary shaft feedthrough. The operations of closing and opening or regulating the flow path can be brought about by a rotary movement of the shaft and of the valve closure about the shaft axis. The vacuum valve is, for example, a butterfly valve, a rotary valve, a throttle valve, a pendulum valve, a louver valve or a chevron-type valve.

According to another possible embodiment, the valve drive is designed for generating a linear movement. The shaft feedthrough is thus a sliding-action shaft feedthrough. The operations of closing and opening or regulating the flow path can be brought about by a linear sliding movement of the shaft and of the valve closure along the shaft axis. The vacuum valve is, for example, a slide valve, a transfer valve or a wedge valve.

By means of the invention, it is possible to keep the radial contact pressure between the outer surface of the shaft and the inner surface of the first sealing ring substantially constant, even at highly elevated temperatures and with associated thermal expansion of the first sealing ring, and thus to create a vacuum valve which can be used within a greater temperature range.

A development of the invention provides a second sealing ring, which is arranged between the, for example, cylindrical inner surface of the supporting ring and the, for example, cylindrical outer surface of the shaft, on a portion of the supporting ring which is oriented away from the bearing surface. A lubricant region is provided between the first sealing ring in one axial direction, the second sealing ring in the other axial direction, the shaft in the radially inward direction and the supporting ring in the radially outward direction. This lubricant region accommodates a lubricant which is prevented from escaping by the two sealing rings. The lubricant generates a sealing film of grease on the shaft and thus, in particular, between the shaft and the first sealing ring. The lubricant enhances the sealing of the first sealing ring, and thus of the shaft feedthrough, and reduces the wear to which the first sealing ring is subjected when the shaft moves. Moreover, the enhanced heat capacity of the lubricant enhances the heat capacity of the shaft feedthrough as a whole, and therefore, in the event of a brief increase in temperature in the valve interior, the increase in temperature of the first sealing ring, and thus the thermal expansion thereof, is reduced. Moreover, the second sealing ring serves for mechanical guidance between the supporting ring and the shaft.

Figure 2:
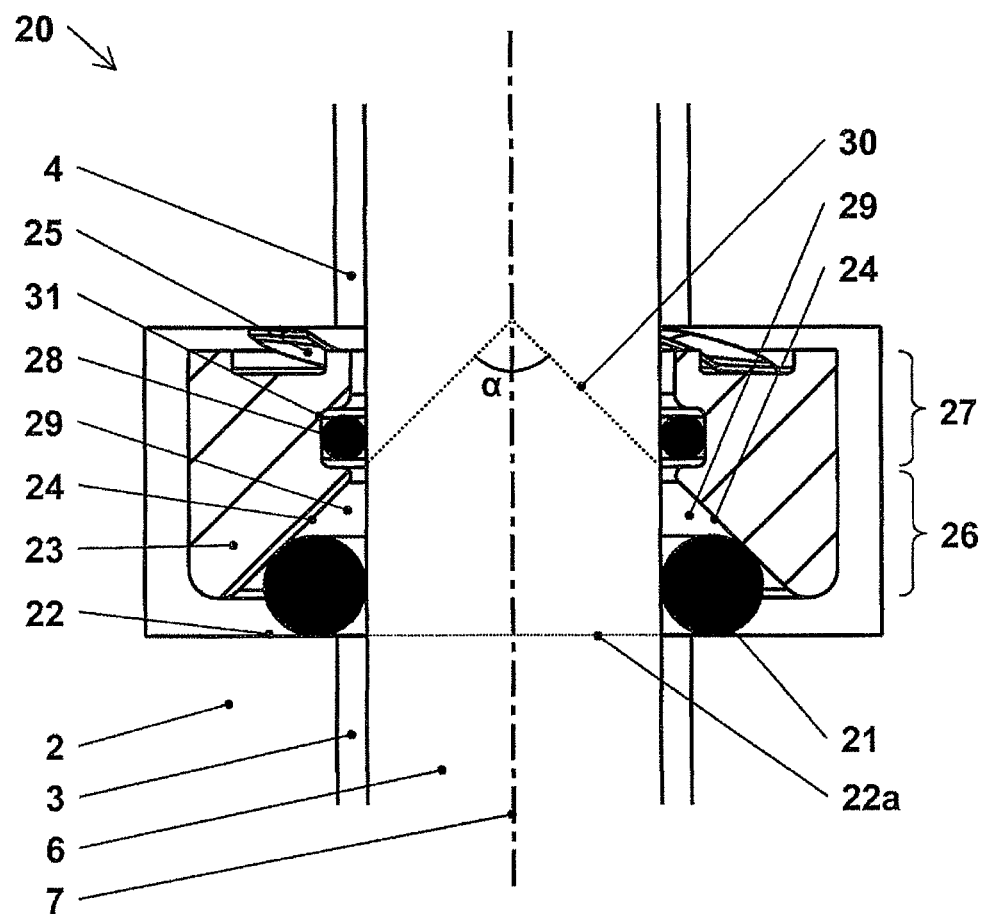

The vacuum valve according to the invention will be described in more detail hereinbelow, purely by way of example, with reference to a concrete exemplary embodiment illustrated schematically in the drawings, in which, specifically:

FIG. 1 shows an overall view by way of a schematic cross section through a vacuum valve with a shaft feedthrough, and FIG. 2 shows a detail by way of a schematic cross section through a shaft feedthrough with two sealing rings.

FIG. 1 illustrates an overall view, by way of a schematic cross section, of a vacuum valve 1 which is suitable for interrupting, releasing and regulating a flow of a medium flowing along a flow path F in the inner region 3 of the vacuum valve 1. The flow path F runs into the plane of the figure and is illustrated by means of the arrow F. The vacuum valve 1 has a valve housing 2, which separates the inner region 3 of the vacuum valve 1 in a gas-tight manner from the atmosphere region 4 outside. A valve drive 5 is coupled to the valve housing 2, and this valve drive can generate a movement in the atmosphere region 4. Since a so-called rotary valve is shown in FIG. 1, the valve drive 5 is designed for generating a rotary movement, which is depicted by means of the arrow 9.

A shaft 6 is coupled to the valve drive 5 and can be rotated thereby about the geometrical shaft axis 7. The shaft 6 is rotationally symmetrical and rectilinear in relation to the shaft axis 7. By means of a sealing shaft feedthrough 20, the shaft 6 is routed in a gas-tight manner from the atmosphere region 4 into the inner region 3, through the valve housing 2, and therefore the movement generated by the valve drive is routed from the atmosphere region 4 into the inner region 3 by way of the shaft 6.

A valve closure 8 in the form of a rotatable closure flap is arranged in the flow path F in the inner region 3, the valve closure being coupled to the shaft 6, mounted thereon and guided thereby. By means of the valve closure 8, the operation of interrupting, releasing or regulating the flow of the medium flowing along the flow path F is brought about by the rotary movement, depicted by the arrow 9. In that position of the valve closure 8 which is illustrated, the vacuum valve 1 is closed and the flow path F is thus interrupted.

FIG. 2 shows a shaft feedthrough 20, in particular the shaft feedthrough 20 of the exemplary embodiment from FIG. 1 or of some other type of vacuum valve. The shaft feedthrough 20 has a first sealing ring 21 in the form of a first O-ring, which consists of a material which expands under the action of heat, for example an elastomer, and which encloses the cylindrical outer surface of the shaft 6 concentrically with gas-tight sealing in the radial direction. The first sealing ring 21 rests on a bearing surface 22, which is coupled to the valve housing 2. The bearing surface is understood to mean that surface on which the first sealing ring 21 actually rests. In the present example, the bearing surface 22 is formed in the valve housing 2. The bearing surface 22 surrounds the shaft 6 and is oriented axially in relation to the shaft 6. In other words, the normals of the plane 22a of the bearing surface 22 run parallel to the shaft axis 7. But in another way, the bearing surface 22 lies in a plane 22a through which the shaft axis 7 passes perpendicularly. The geometrical axis 7 of the shaft 6 thus forms a normal to this plane 22a. The first sealing ring 21 rests on the bearing surface 22 with gas-tight sealing in the axial direction such that the first sealing ring 21 is fixed axially in a direction parallel to the shaft 6. In the present case, this direction runs toward the inner region 3.

Moreover, the shaft feedthrough 20 comprises a supporting ring 23, which consists of a rigid material, in particular of an alloy, and is arranged concentrically all the way round the shaft 6, and axially opposite the bearing surface 22. The supporting ring 23 can be moved axially to a limited extent relative to the bearing surface 22 and to the shaft 6, that is to say parallel to the shaft axis 7. A portion 26 oriented toward the bearing surface 22 has formed on it an inner conical segment 24, which runs concentrically around the shaft 6 and encloses the same. The inner conical segment 24 widens in the direction of the bearing surface 22 and of the inner region 3. The first sealing ring 21 is at least partially enclosed all the way round by the inner conical segment 24.

In the exemplary embodiment shown, the inner conical segment 24 of the supporting ring 23, which is rotationally symmetrical about the shaft axis 7, widens with a cone-opening angle α of 90° in the direction of the bearing surface 22.

As shown in FIG. 2 by means of dashed lines, the cone-opening angle α should be understood to mean the inner angle of the tip of the virtual cone 30 defined by the inner conical segment 24.

A helical elastic spring 25, which extends all the way round the shaft 6, forces the supporting ring 23 axially in the direction of the bearing surface 22 such that the conical segment 24 forces the first sealing ring 21 in an elastically compliant manner, and substantially under constant contact pressure, onto the bearing surface 22 and the shaft 6. If the first sealing ring 21 then undergoes thermal expansion, the supporting ring 23 yields to this expansion by way of a linear axial movement parallel to the shaft axis 7 in the direction of the atmosphere region 4, and therefore the radial contact-pressure force, between the first sealing ring 21 and the outer surface of the shaft 6 increases only to an insignificant extent within certain limits. In other words, the cone-opening angle α is such that radial expansion of the first sealing ring 21 brought about by the first sealing ring 21 being subjected to the action of heat gives rise to an axial movement of the supporting ring 23 in the direction away from the bearing surface 22, wherein the elastic spring 25 is designed such that it yields to the axial movement of the supporting ring 23 brought about by the radial expansion.

Also provided is a second sealing ring 28, which is arranged radially between an inner groove 31 of the supporting ring 23 and the outer surface of the shaft 6, on a portion 27 of the supporting ring 23 which is oriented away from the bearing surface 22. A lubricant region 29 is formed between the first sealing ring 21, the second sealing ring 28, the shaft 6 and the supporting ring 23, this lubricant region being designed for the purpose of accommodating a lubricant for generating a sealing film of grease between the shaft 6 and the first seal 21. This film of grease enhances the sealing between the first sealing ring 21 and the shaft 6. Moreover, the wear to which the first sealing ring 21 is subjected is reduced and undesired particles of material are collected in the lubricant.

That shaft feedthrough 20 of the vacuum valve 1 according to the invention which is shown in FIG. 2 can be used both as a rotary shaft feedthrough and as a sliding-action shaft feedthrough. In the case of a rotary shaft feedthrough, the valve drive 5 is designed for generating a rotary movement, and the operations of closing, opening and regulating the flow path F can be brought about by a rotary movement of the shaft 6 and of the valve closure 8 about the shaft axis 7. In the case of a sliding-action shaft feedthrough, the valve drive 5 is designed for generating a linear movement, and the operations of closing, opening and regulating the flow path F are brought about by a linear sliding movement of the shaft 6 and of the valve closure 8 along the shaft axis 7.

Even though, in the embodiments of FIGS. 1 and 2, the portion 26 of the supporting ring 23 which is oriented toward the bearing surface 22 is directed toward the inner region 3, and the supporting ring 23 and the spring 25 are arranged in the atmosphere region 4, it is also possible, as an alternative, to provide an arrangement the other way round in which the portion 27 of the supporting ring 23 which is oriented away from the bearing surface 22 is directed toward the inner region 3, and the supporting ring 23 and the spring 25 are arranged in the inner region 3, that is to say the inner region 3 and the atmosphere region 4 have been swapped round in FIG. 2.

The invention claimed is:

1. A vacuum valve for interrupting, releasing or regulating a flow of a medium flowing along a flow path in an inner region of the vacuum valve, having
    a valve housing, which separates the inner region of the vacuum valve in a gas-tight manner from the atmosphere region outside the vacuum valve,
    a valve drive for generating a movement in the atmosphere region,
    a shaft,
        which is coupled to the valve drive,
        which has a geometrical shaft axis,
        which is routed in a gas-tight manner from the atmosphere region into the inner region, through the valve housing, by way of a sealing shaft feedthrough, and by means of which the movement can be transmitted from the atmosphere region into the inner region, and a valve closure, which is arranged in the flow path in the inner region, which is coupled to the shaft, and by means of which the operation of interrupting, releasing or regulating the flow of the medium flowing along the flow path can be brought about by the movement, wherein the shaft feedthrough has a first sealing ring, which consists of a material which expands under the action of heat, and which encloses the shaft concentrically with gas-tight sealing in the radial direction, a bearing surface, which is coupled to the valve housing and encloses the shaft, which is oriented axially in relation to the shaft and runs substantially in a plane to which the geometrical axis of the shaft forms a normal, and on which the first sealing ring rests with gas-tight sealing such that the first sealing ring is fixed axially in a direction parallel to the shaft, wherein the first sealing ring rests on the bearing surface with gas-tight sealing in the axial direction and the first sealing ring gives rise to gas-tight contact between the bearing surface and the shaft, a supporting ring, which consists of a substantially rigid material, which is arranged concentrically all the way round the shaft, and axially opposite the bearing surface, which can be moved axially to a limited extent relative to the bearing surface, to the valve housing and to the shaft, and which has, on a portion oriented toward the bearing surface, an inner conical segment, which runs concentrically around the shaft and encloses the same, widens with a cone-opening angle in the direction of the bearing surface, and at least partially encloses the first sealing ring all the way round, and an elastic spring, which forces the supporting ring axially in the direction of the bearing surface such that the conical segment forces the first sealing ring in an elastically compliant manner, and substantially under constant contact pressure, onto the bearing surface and the shaft, wherein the cone-opening angle is such that radial expansion of the first sealing ring brought about by the first sealing ring being subjected to the action of heat gives rise to an axial movement of the supporting ring in the direction away from the bearing surface, and wherein the elastic spring is designed such that the elastic spring yields to the axial movement of the supporting ring brought about by the radial expansion, wherein the first sealing ring is designed as a first O-ring, as seen in the axial direction, there is substantially annular, sealing contact between the first O-ring and the bearing surface, as seen in the radial direction, there is substantially annular, sealing contact between the first O-ring and the shaft, and as seen in the direction which is oblique in relation to the bearing surface and to the shaft, there is supporting contact between the first O-ring and the inner conical segment of the supporting ring.

2. The vacuum valve as claimed in claim 1,
wherein
a second sealing ring, which is arranged between the supporting ring and the shaft, on a portion of the supporting ring which is oriented away from the bearing surface, and a lubricant region, which is formed between
the first sealing ring,
the second sealing ring,
the shaft, and
the supporting ring for the purpose of accommodating a lubricant for generating a sealing film with grease between the shaft and the first seal.

3. The vacuum valve as claimed in claim 2,
wherein
the portion of the supporting ring which is oriented toward the bearing surface is directed toward the inner region, and the supporting ring and the spring are arranged in the atmosphere region.

4. The vacuum valve as claimed in claim 1,
wherein
the portion of the supporting ring which is oriented toward the bearing surface is directed toward the inner region, and the supporting ring and the spring are arranged in the atmosphere region.

5. The vacuum valve according to claim 1, wherein the inner conical segment of the supporting ring widens with a cone-opening angle of 45° to 135°, in particular 80 to 100°, in the direction of the bearing surface.

6. The vacuum valve according to any claim 1, wherein the bearing surface is formed on the valve housing.

7. The vacuum valve according to claim 1,
wherein
the valve drive is designed for generating a rotary movement,
the shaft feedthrough is designed as a rotary shaft feedthrough, and
the operations of closing and opening or regulating the flow path can be brought about by a rotary movement of the shaft and of the valve closure about the shaft axis.

8. The vacuum valve according to claim 1, wherein the inner conical segment of the supporting ring widens with a cone-opening angle of 80° to 100° in the direction of the bearing surface.

* * * * *